United States Patent
Wang et al.

(10) Patent No.: US 9,345,012 B2
(45) Date of Patent: May 17, 2016

(54) COMMUNICATION DEVICES AND METHODS FOR PERFORMING COMMUNICATION

(75) Inventors: Haiguang Wang, Singapore (SG); Anh Tuan Hoang, Singapore (SG); Jaya Shankar s/o Pathmasuntharam, Singapore (SG); Shoukang Zheng, Singapore (SG); Zhongding Lei, Singapore (SG); Chee Ming Joseph Teo, Singapore (SG); Wai Leong Yeow, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 281 days.

(21) Appl. No.: 14/002,889

(22) PCT Filed: Mar. 2, 2012

(86) PCT No.: PCT/SG2012/000067
§ 371 (c)(1),
(2), (4) Date: Nov. 12, 2013

(87) PCT Pub. No.: WO2012/118448
PCT Pub. Date: Sep. 7, 2012

(65) Prior Publication Data
US 2014/0056248 A1 Feb. 27, 2014

(30) Foreign Application Priority Data

| | | | |
|---|---|---|---|
| Mar. 3, 2011 | (SG) | ............... | 201101534-4 |
| Mar. 3, 2011 | (SG) | ............... | 201101535-1 |
| May 12, 2011 | (SG) | ............... | 201103402-2 |
| Jul. 18, 2011 | (SG) | ............... | 201105179-4 |
| Sep. 19, 2011 | (SG) | ............... | 201106745-1 |

(51) Int. Cl.
*H04W 72/04* (2009.01)
*H04W 76/02* (2009.01)
(Continued)

(52) U.S. Cl.
CPC .......... *H04W 72/042* (2013.01); *H04L 1/1864* (2013.01); *H04W 76/023* (2013.01); *H04L 2001/0092* (2013.01)

(58) Field of Classification Search
None
See application file for complete search history.

(56) References Cited

U.S. PATENT DOCUMENTS

| | | | |
|---|---|---|---|
| 7,321,771 B2 | 1/2008 | Lin et al. | |
| 8,023,446 B2 * | 9/2011 | Zhang | H04W 76/021 370/315 |

(Continued)

OTHER PUBLICATIONS

Godfrey, 802.16n System Requirements Document, IEEE 802.16 Broadband Wireless Access Working Group (IEEE 2010).

(Continued)

*Primary Examiner* — Jackie Zuniga Abad
(74) *Attorney, Agent, or Firm* — K. David Crockett, Esq.; Niky Economy Syrengelas, Esq.; Crockett & Crockett, PC

(57) ABSTRACT

There is provided a method for performing direct mobile-to-mobile communication in a cellular mobile communication system, the cellular mobile communication system having at least two mobile stations and a communication network. The method includes associating a first mobile station and a second mobile station with at least one base station of the communication network, performing neighbor discovery between the first mobile station and the second mobile station for reporting to the at least one base station, detecting the feasibility of direct communication between the first mobile station and the second mobile station, establishing a direct communication link between the at least two mobile stations, allocating identification for communication and flow and resources for a flow between the first mobile station and the second mobile station, synchronizing the flow between the first mobile station and the second mobile station, and sending automatic repeat requests (ARQ) messages.

10 Claims, 11 Drawing Sheets

(51) Int. Cl.
*H04L 1/18* (2006.01)
*H04L 1/00* (2006.01)

(56) References Cited

U.S. PATENT DOCUMENTS

| | | | |
|---|---|---|---|
| 2008/0095108 A1 | 4/2008 | Malladi et al. | |
| 2008/0316954 A1* | 12/2008 | Zheng | H04B 7/2606 370/315 |
| 2010/0120392 A1* | 5/2010 | Youn | H04B 7/2606 455/404.1 |
| 2010/0254348 A1 | 10/2010 | Prakash et al. | |

OTHER PUBLICATIONS

Godfrey, 802.16n System Requirements Document Including SARM Annex, IEEE 802.16 Broadband Wireless Access Working Group (IEEE 2011).

IEEE Standards Association, Part 16: Air Interface for Broadband Wireless Access Systems, IEEE Standard for Local and Metropolitan Area Networks IEEE Std 802.16_2009 (IEEE 2009).

IEEE Standards Association, Part 16: Air Interface for Broadband Wireless Access Systems, IEEE Standard for Local and Metropolitan Area Networks IEEE Std 802.16m_2011 (IEEE 2011).

* cited by examiner

COMMUNICATION DEVICES AND METHODS FOR PERFORMING COMMUNICATION

RELATED APPLICATIONS

The present application claims priority to the following Singapore Patent Applications: 201101535-1 filed on Mar. 3, 2011, 201101534-4 filed on Mar. 3, 2011, 201103402-2, filed on May 12, 2011, 201105179-4 filed on Jul. 18, 2011, 201106745-1 filed on Sep. 19, 2011, all of which are herein incorporated by reference in their entirety.

FIELD OF THE DISCLOSURE

Embodiments of the invention generally relate to a communication terminal and a method for performing communication.

BACKGROUND

The IEEE 802.16n System Requirements Document (SRD) specifies a requirement for High Reliability (HR) network. As such, one of the requirements is for the mobile stations (HR-MSs) to communicate directly with each other in the event of network failure. The HR-MS to HR-MS direct communications scenario could for example occur in the event of a disaster where the backbone network is destroyed. The rescue teams (e.g. firemen and police officers) would have to communicate directly with each other without a backbone network in order to provide disaster recovery.

SUMMARY

In a first implementation, a method for performing direct mobile-to-mobile communication in a cellular mobile communication system, the cellular mobile communication system having at least two mobile stations and a communication network for providing a communication connection between the at least two mobile stations via at least one base station of the communication network is provided. The Method for performing direct mobile-to-mobile communication in a cellular mobile communication system includes associating a first mobile station and a second mobile station with the at least one base station, performing neighbor discovery between the first mobile station and the second mobile station for reporting to the at least one base station, detecting the feasibility of direct communication between the first mobile station and the second mobile station, establishing a direct communication link between the at least two mobile stations, allocating identification for communication and flow and resources for a flow between the first mobile station and the second mobile station, synchronizing the flow between the first mobile station and the second mobile station, and sending automatic repeat requests (ARQ) messages. Allocating identification for communication and flow may include allocating a connection identification (CID) or a station identification (STID) to the direct communication link.

In another implementation, a mobile station for performing direct mobile-to-mobile communication in a cellular mobile communication system, the cellular mobile communication system comprising at least two mobile stations and a communication network for providing a communication connection between the at least two mobile stations via at least one base station of the communication network is provided. The mobile station includes a transceiver configured to perform communication with other mobile stations, a detector configured to perform neighbor discovery, report the results of the neighbor discovery to other stations, record the results from the neighbor discovery including any transmitted address information, and using the recorded results, determine the feasibility of direct communication for a given mobile station, and a synchronizer configured to synchronize a link between the mobile station and another mobile station.

In yet another implementation, a method for performing communication in a mobile ad-hoc network includes initializing a first mobile station into ad-hoc mode, discovering whether a suitable existing ad-hoc network is within range of the first mobile station, joining the first mobile station to an ad-hoc network by having the first mobile station join the suitable existing ad-hoc network or by designating the first mobile station as a coordinator in a new ad-hoc network, and communicating with the second mobile station from the first mobile station using the ad-hoc network. The coordinator may generally be a device with similar functionality as a base station.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Reference will now be made to figures wherein like structures will be provided with like reference designations. It is understood that the drawings are diagrammatic and schematic representations of exemplary embodiments of the invention, and are not limiting of the present invention nor are they necessarily drawn to scale.

Direct mobile-to-mobile communication in, for instance an IEEE 802.16n system, may help improve network capacity and reliability. In the case of an IEEE 802.16n system, HR- MS to HR-MS direct communication can be classified into two categories: with a supporting base station (HR-BS), and without a supporting HR-BS.

Figure 1:
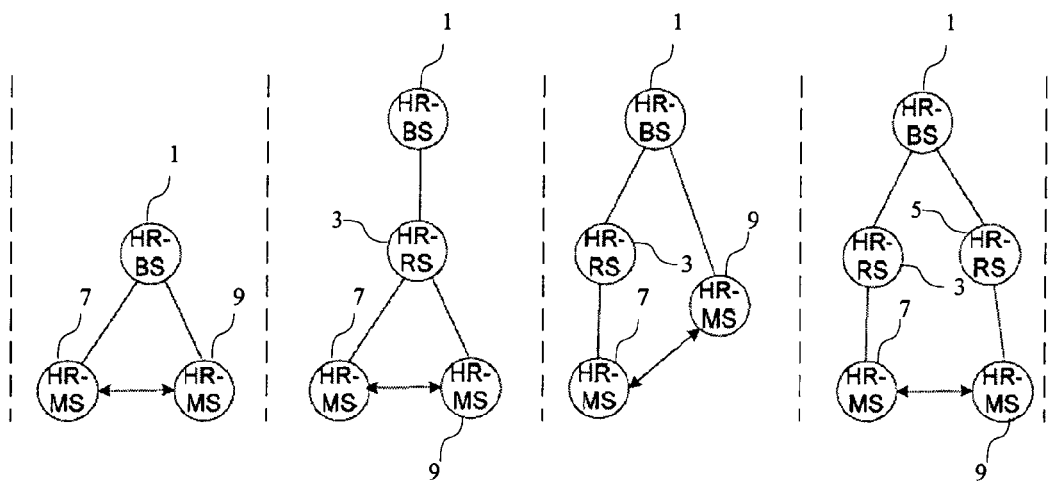
FIG. 1 shows communication systems according to embodiments.

With reference to FIG. 1, communication systems are depicted in which HR-MS 7 is directly communicating with HR-MS 9 with HR-BS 1 supporting the direct communication. One or more relay stations (HR-RS), as depicted, may also be included in communication systems according to various embodiments. For example, HR-RS 3 may be arranged to provide relay services from HR-BS 1 to both HR-MS 7 and HR-MS 9. Alternatively, HR-RS 3 may be arranged to provide relay services from HR-BS 1 to HR-MS 7 but not to HR-MS 9. As a further example, there may be HR-RS 5 arranged to provide relay services from HR-BS 1 to HR-MS 9 while HR-RS 3 is arranged to provide relay services from HR-BS1 to HR-MS 7. It is noted that while a finite number of HR-BSs, HR-RSs, and HR-MSs are shown in FIG. 1, communication systems may be scaled to include multiple HR-BSs, HR-RSs, and HR-MSs.

With current 802.16 networks, when there is a base station, the MS is not allowed to talk to another MS. All the data packets must be sent to base station. Some regulatory regimes require that base stations (BS) have real-time control over cellular services. HR-MS to HR-MS direct communication, however, radio resources can be conserved in certain environments. Moreover, an 802.16n network, as described herein, is more capable of maintaining reliable communications during disasters.

To enable HR-MS to HR-MS direct communication with a supporting base station, several improvements over existing standard such as 802.16e or 802.16m are necessary.

Figure 2:
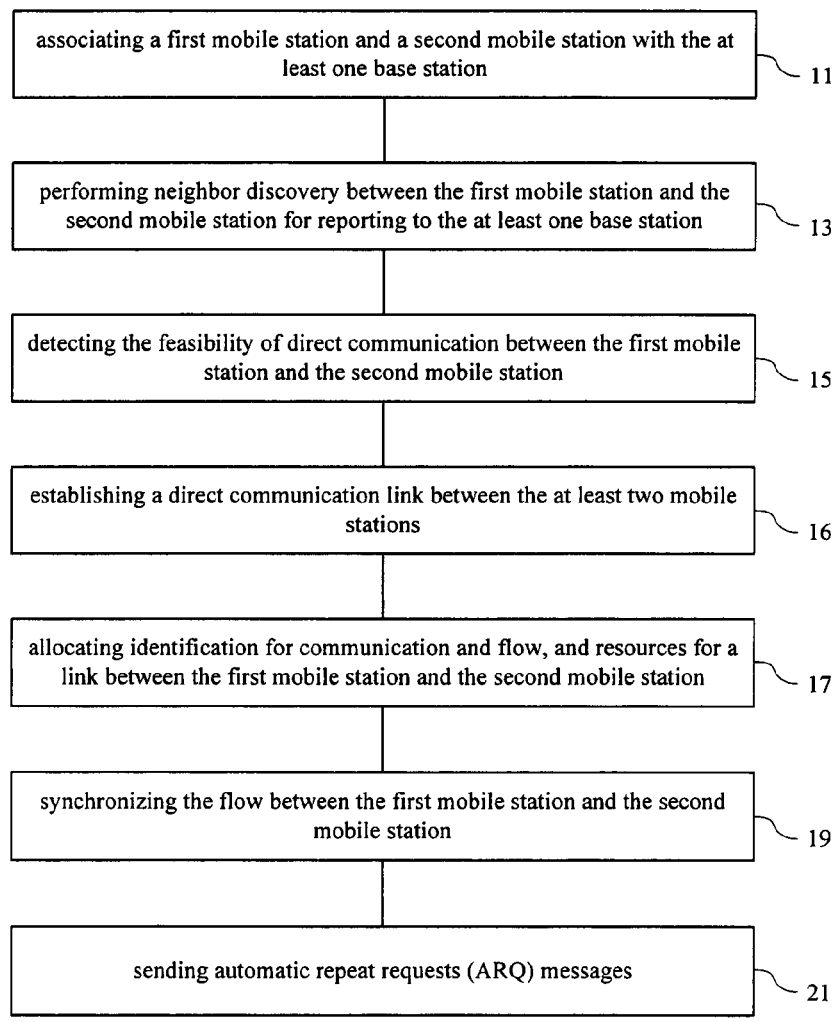
FIG. 2 shows a flow diagram according to an embodiment.

For instance, with reference to FIG. 2, a flow diagram according to an embodiment is shown, in which a method for performing direct mobile-to-mobile communication in a cellular mobile communication system is depicted. The method includes associating 11 a first mobile station and a second mobile station with the at least one base station, performing 13 neighbor discovery between the first mobile station and the second mobile station for reporting to the at least one base station, detecting 15 the feasibility of direct communication between the first mobile station and the second mobile station, establishing 16 a direct communication link between the at least two mobile stations, allocating 17 identification for communication and flow and resources for a flow between the first mobile station (MS) and the second mobile station, synchronizing 19 the flow between the first mobile station and the second mobile station, and sending 21 automatic repeat requests (ARQ) messages. Once data transmission has been completed, one of the mobile stations can notify a base station, or more generally any common infrastructure station, to tear down the direct communication link.

As an illustrative example, HR-MS 7 and HR-MS 9 associate 11 with HR-BS 1, and perform 13 neighbor discovery. Preferably, HR-BS 1 schedules the HR-MSs to do neighbor discovery. A suitable method for HR-MS neighbor discovery is described in Singapore Patent Application No. 201101131-9, which is hereby incorporated by reference in its entirety. As described therein, it can be assumed that HR-MSs are capable of know who their neighbors are and can report their one hop neighbors to a BS from time to time. The results of the neighbor discovery may be communicated and/or stored including address information. That is, HR-MS 7 and HR-MS 9 may report the results of their respective neighbor discovery to HR-BS 1 for stored maintenance thereon. Alternatively or additionally, HR-MS 7 and HR-MS 9 may report the results of their respective neighbor discovery to one another for storage, or may provide individual address information as part of the neighbor discovery process.

As a result of the neighbor discovery process, HR-BS 1, HR-MS 7, and/or HR-MS 9 may have stored address information indicating HR-MSs neighbors. If HR-MS 7 has stored address information for HR-MS 9 as part of the neighbor discovery process, HR-MS 7 can detect the feasibility of direct communication to HR-MS 9 by determining whether it has stored address information corresponding to HR-MS 9. If HR-MS 7 does not have stored address information for HR-MS 9, HR-BS 1 can determine whether the neighboring table stored on HR-BS 1 lists address information indicating that HR-MS 7 and HR-MS 9 are capable of direct communication between one another. HR-RSs may provide relay services for HR-BSs, and thus the feasibility of HR-MS to HR-MS direct communication may be capable of being detected at HR-MSs, HR-RSs, and/or HR-BSs.

The stored address information, as applied, may generally be network layer address information such as Internet Protocol (IP) address information. For instance, in an 802.16 network, when an MS starts a new flow from application layer, the 802.16 media access control (MAC) carrier sense (CS) sub-layer classifies the flow first. It extracts the source and destination IP address from the data packet. Thus if an HR-MS knows all its neighbors IP addresses via neighbor discovery, it can determine whether HR-MS direct communication can be performed or not. Whether such information is available may depend on the information provided in neighbor discovery messages. Sometimes the IP address of a neighboring node may not available. In such cases, a HR-BS or HR-RS should inform the HR-MS of other HR-MSs's IP addresses since detection may be performed at by the HR-BS/HR-RS.

The stored address information, as applied, may also be the address that HR-BS/HR-RS assigned to its associated HR-MSs.

The feasibility of direct communication can be detected by the HR-RS/HR-BS, but the HR-BS/HR-RS should maintain a neighboring table at the MAC layer. After the CS sub-layer has classified the flow, the HR-MS should send a dynamic service add request (DSA-REQ) to the HR-BS/HR-RS to get a flow ID from the HR-BS/HR-RS. The source and destination IP address is attached in the DSA-REQ and thus the HR-RS/HR-BS can detect the feasibility of HR-MS direct communication based on the IP addresses in the DSA-REQ by, for example, comparing the provided IP addresses to its neighboring table.

The above feasibility detection works well when both HR-MSs are associated with the HR-RS/HR-BS. If the two HR-MSs are associated with different infrastructure stations—that is each HR-MS is associated with different HR-RSs or one HR-MS is associated with one HR-RS and the other HR-MS is associated with a HR-BS directly—then the feasibility may only be able to be detected by the HR-BS upon receiving a data packet from a HR-MS. As described above, at that point the HR-BS is capable of detecting the feasibility of direct communication by checking the source and destination IP address inside the data packet.

Figure 3:
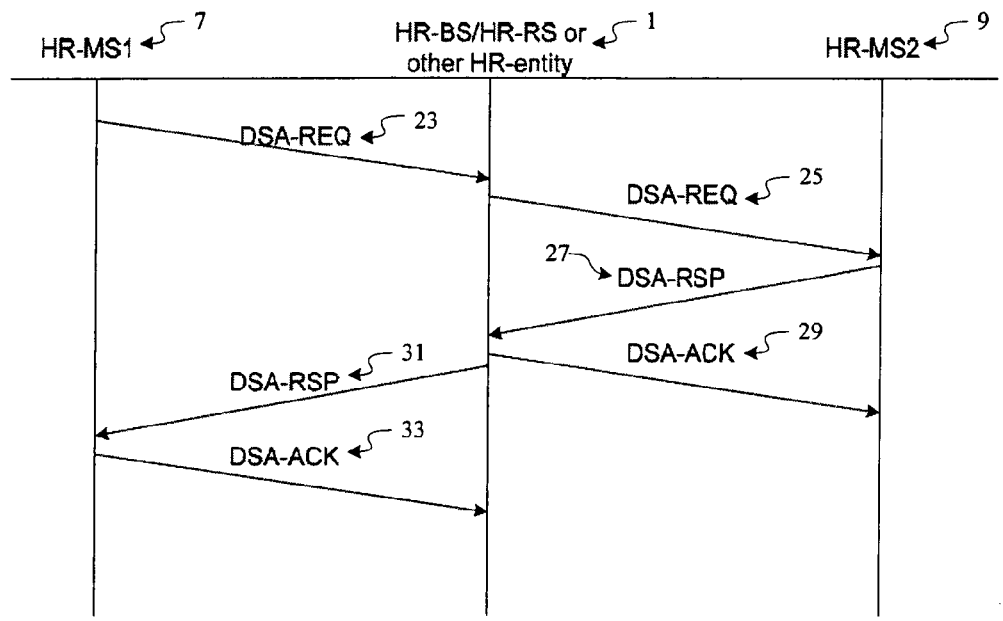
FIGS. 3-4 show message flow diagrams according to embodiments.

In FIG. 3 a message flow diagram according to an embodiment, in which a request for a service flow creation between the first mobile station 7 and the second mobile station 9 are allocated 17. The allocation 17 request includes sending 23 a dynamic service add request (DSA-REQ) from the first mobile station to the at least one base station 1. The DSA-REQ includes address information corresponding to the first mobile station 7 and address information corresponding to the second mobile station 9, as heretofore described. The allocation 17 request further includes, reserving communication and flow identification resources, communicating the reserved radio resources to the second mobile station 9, sending 25, from the at least one base station 1 to the second mobile station 9, notification of the dynamic service add request (DSA-REQ), sending 27, from the second mobile station 9 to the at least one base station 1, a dynamic service add response (DSA-RSP), sending 29, from the at least one base station 1 to the second mobile station 9, a dynamic service add acknowledgment (DSA-ACK), communicating the reserved radio resources to the first mobile station 7, sending 31, from the at least one base station 1 to the first mobile station 7, notification of the dynamic service add response (DSA-RSP), sending 33, from the at least one base station to the first mobile station 7, a dynamic service add acknowledgment (DSA-ACK), and monitoring the reserved radio resources by the second mobile station for a synchronization signal.

As an illustrative example, when HR-MS 7 wants to directly transmit a data packet to HR-MS 9, it first sends a request 23 to HR-BS 1 for service flow creation. When HR-BS 1 receives the service flow creation request, it holds on the response to HR-MS 7 first and notifies 25 HR-MS 9 regarding the service creation request. It is also possible for HR-BS 1 to first send a response to HR-MS 7 and hold off on scheduling the direct transmission until HR-MS 9 is ready for transmission. Having been notified of the service creation request, HR-MS 9 sends 27 back a response to HR-BS 1 and monitors the relative wireless channel or sub-channel for synchronization signals from HR-MS 7. HR-BS 1 continues by sending 31 the delayed response to HR-MS 7, which in turn sends 33 an acknowledgment back to HR-BS 1.

The flow-id allocated for the direct communication is contained in the direct service add (DSA) messages, and preferably, once the HR-BS/HR-RS or other HR-entity (infrastructure entity) assigns a flow-id for direct communication, the assigned flow-id may be sent to both the source HR-MS and the destination HR-MS with the DSA-REQ and DSA-RSP.

Figure 4:
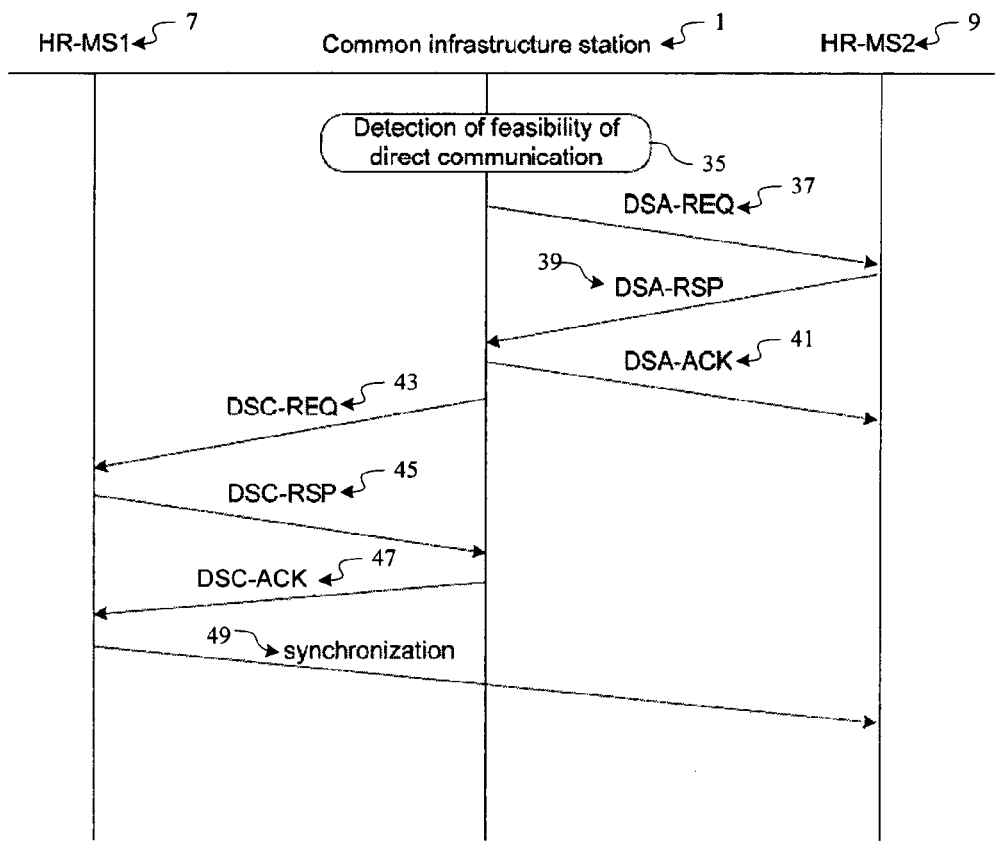

FIG. 4 shows a message flow diagram according to an embodiment, in which a direct communication service flow between the first mobile station 7 and the second mobile station 9 are allocated 17. The depicted service flow creation is particularly useful when the first mobile station 7 and the second mobile station 9 are associated with different infrastructure entities. In such cases a common infrastructure entity, can detect the feasibility of HR-MS direct communication. Once feasibility is detected, the following allocation procedure may used in establishing direct communication. The allocation 17 includes reserving flow identification, communicating the flow identification to the second mobile station 9, sending 37 a dynamic service add request (DSA-REQ) from the at least one base station to the second mobile station 9, sending 39, from the second mobile station 9 to the at least one base station 1, a dynamic service add response (DSA-RSP), sending 41, from the at least one base station to the second mobile station, a dynamic service add acknowledgment (DSA-ACK), communicating the reserved service flow identification to the first mobile station, sending 43 a dynamic service change request (DSC-REQ) from the at least one base station to the first mobile station 7, sending 45, from the first mobile station 7 to the at least one base station, a dynamic service change response (DSC-RSP), sending 47, from the at least one base station 1 to the first mobile station, a dynamic service change acknowledgment (DSC-ACK), monitoring the reserved radio resources by the second mobile station 9 for a synchronization signal 49.

Figure 6:
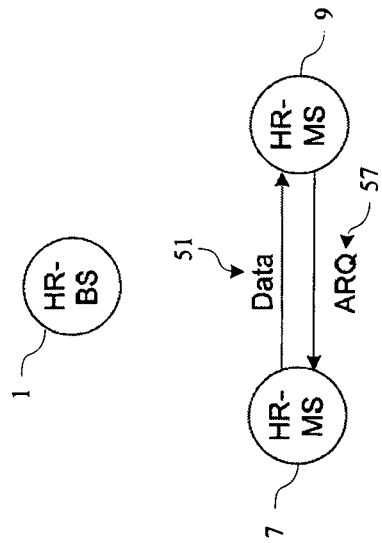
FIGS. 5-6 show flow diagrams according to embodiments.
Figure 5:
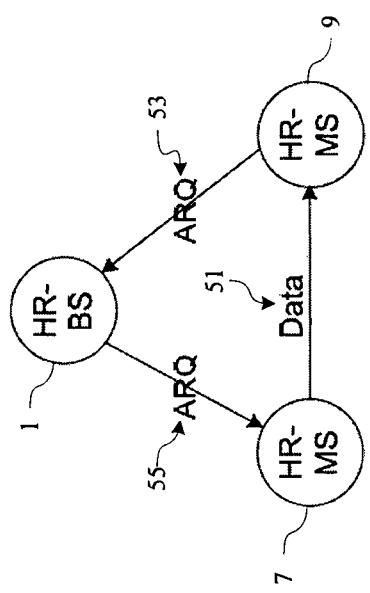

FIGS. 5-6 show flow diagrams according to embodiments. In particular, once data flow 51 is established ARQ messages 57 can be sent over the direct communication channel between HR-MS 9 and HR-MS 7. For example, HR-MS 7 and destination HR-MS 9 may alternate use the direct communication link between data and ARQ message transmissions. Alternatively HR-BS 1 can help in forwarding the ARQ messages 53, 55. Thus sending automatic repeat requests (ARQ) messages may occur either directly between a first mobile station and a second mobile station, or may occur via a base station. Additional infrastructure entities, such as HR-BS 1, may be capable of notifying the HR-MSs of the transmission opportunities and radio resource assignment either via a dedicated control messages or via the schedule IE in the MAP.

Figure 7:
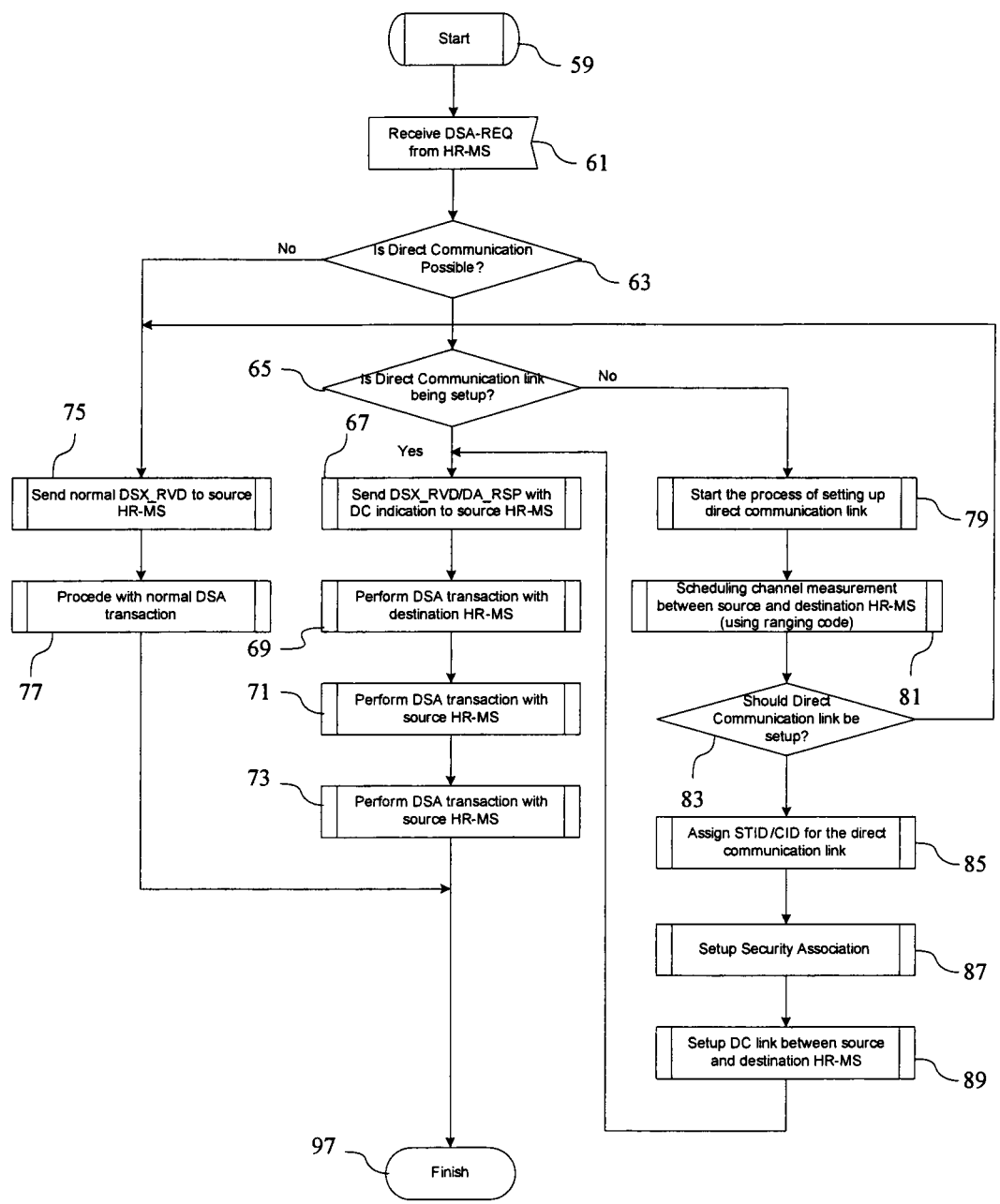
FIGS. 7-8 show flow diagrams implementing the message flow diagrams of FIGS. 3-4, according to embodiments.
Figure 8:
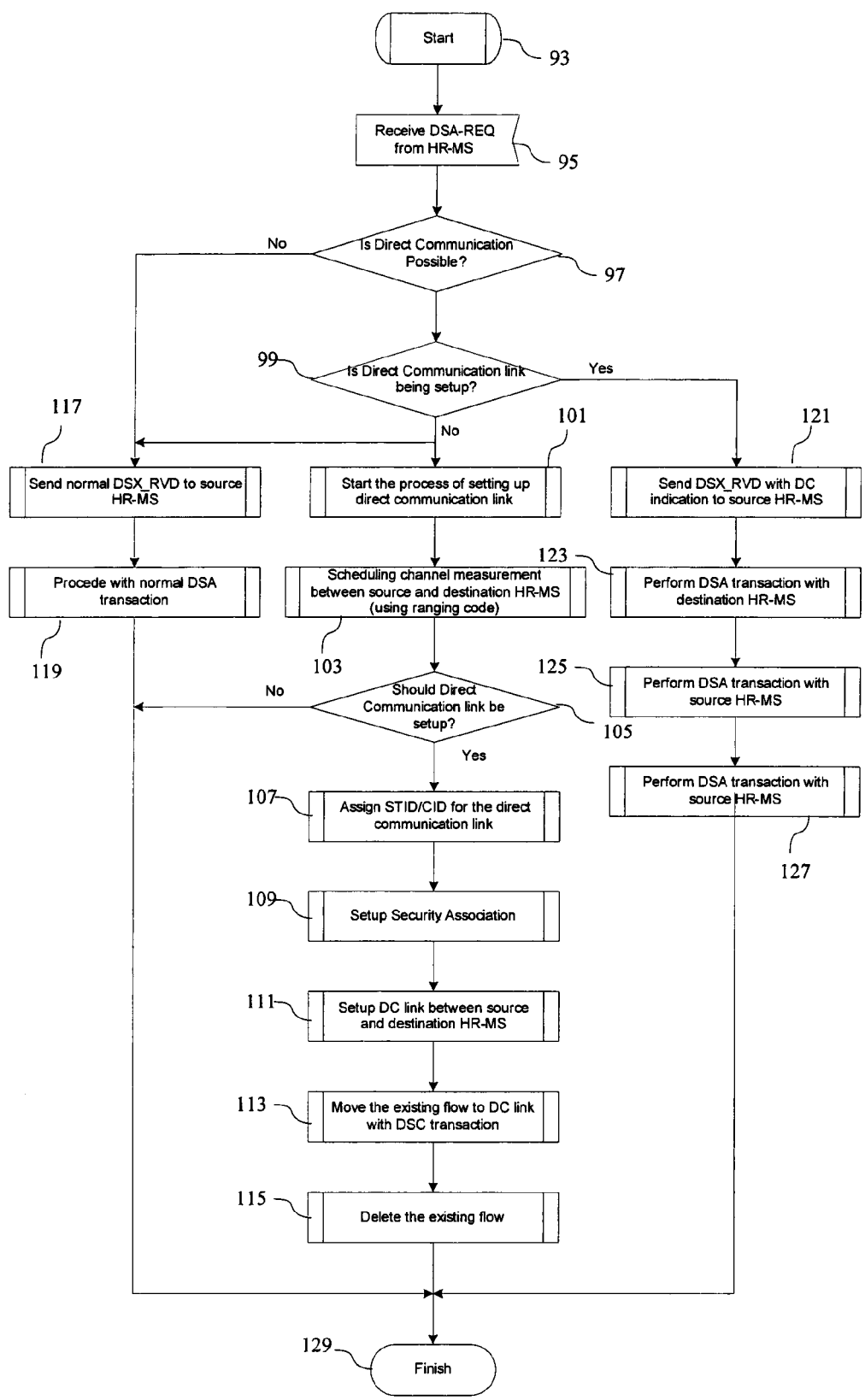

FIGS. 7-8 show flow diagrams implementing the message flow diagrams of FIGS. 3-4, according to embodiments. When HR-BS 1 receives s DSA-REQ from HR-MS 7 and determines that the HR-MS 7 and HR-MS 9 are neighbors, but that a direct communication link has not yet been setup, HR-BS 1 can take two strategies to setup direct communication. A first strategy, as discussed with respect to FIG. 3, is to delay the response to the HR-MS 7 and setup a direct communication link first, and allowing the HR-MSs to communicate data over the direct communication link. A second strategy is to setup the flow as usual while simultaneously having HR-BS 1 setup a direct communication link between HR-MS 7 and HR-MS 9 and moving the data communications over to the direct communication link after it has been established.

In particular, FIG. 7 implements the message flow in the first strategy where HR-BS 1 receives 61 a resource allocation request (RSA-REQ) from HR-MS 7, and holds off on providing a response to HR-MS 7. Upon receiving 61 the DSA-REQ from HR-MS 7, HR-BS 1 determines 63 whether direction communication is possible between, for example, HR-MS 7 and HR-MS 9. If direct communication is not possible between HR-MS 7 and HR-MS 9, HR-BS 1 sends 75 a normal DSX-RVD to HR-MS 7 and finishes the with a normal DSA transaction 77. If, however, direct communication is possible between HR-MS 7 and HR-MS9, a determination 65 is made whether direct communication is being setup. If a direct communication link is not being set up, the process 79 of setting up a direct communication link commences and channel measurement between HR-MS 7 and HR-MS 9, is scheduled 81. Channel measurement can, for example, be measure by employing ranging codes. Based on the results of the channel measurement, a determination 83 is made whether a direct communication link should be setup. If affirmative, HR-BS 1 assigns 85 a station ID/connection ID (STID/CID) for the direct communication (DC) link between HR-MS 7 and HR-MS 9, sets up 87 a security association, and sets up 89 the direct connection link between HR-MS 7 and HR-MS 9. A DSX-RVD/DA-RSP with a DC indication is then sent to HR-MS 7, after which HR-BS 1 performs DSA transactions 84, 87, 89 with HR-MS 7 and HR-MS 9.

FIG. 8 implements the message flow in the first strategy where the data flow is setup as usual while simultaneously having HR-BS 1 setup a direct communication link between HR-MS 7 and HR-MS 9 and moving the data communications over to the direct communication link after it has been established. Upon receiving 95 the DSA-REQ from HR-MS 7, HR-BS 1 determines 97 whether direction communication is possible between, for example, HR-MS 7 and HR-MS 9. If direct communication is not possible between HR-MS 7 and HR-MS 9, HR-BS 1 sends 117 a normal DSL-RVD to HR-MS 7 and finishes the with a normal DSA transaction 77. If, however, direct communication is possible between HR-MS 7 and HR-MS9, a determination 99 is made whether direct communication is being setup. If a direct communication link is not being set up, the process 101 of setting up a direct communication link commences and channel measurement between HR-MS 7 and HR-MS 9, is scheduled 103. Channel measurement can, for example, be measure by employing ranging codes. Based on the results of the channel measurement, a determination 105 is made whether a direct communication link should be setup. If affirmative, HR-BS 1 assigns 107 a station ID/connection ID (STID/CID) for the direct communication (DC) link between HR-MS 7 and HR-MS 9, sets up 109 a security association, and sets up 111 the direct connection link between HR-MS 7 and HR-MS 9. The existing data communications flow is moved over to the direct communication link after it has been established and the existing data communications flow is deleted 115. If a direct communication link is being set up, a DSX-RVD/DA-RSP with a DC indication is then sent 121 to HR-MS 7 when HR-BS 1 performs DSA transactions 123, 125, 127 with HR-MS 7 and HR-MS 9.

To facilitate the scheduling of direct communication link, connection ID (CID, for 802.16e) for Station ID (STID for 802.16m) may be assigned for each direct communication link and use in the MAP for the scheduling. A flag in the scheduling IE may indicate which should transmit with the assigned slots. It is also possible that two CIDs/STIDs being assigned to each direct communication link and each of them represent one direction of the link.

To enable direct communication between HR-MSs, HR-MSs need to carry out neighbor discovery and channel measurement for their direct radio link. Neighbor discovery and channel measurement can be carried out through transmitting and receiving ranging signals between HR-MSs. Dedicated ranging codes and ranging channels can be assigned by the serving HR-BS/RS for this peer-to-peer ranging purpose.

In another approach, the peer-to-peer ranging between HR-MSs can also be carried out in an opportunistic way. When an HR-MS transmits a dedicated ranging signal, on a known ranging channel, to its serving HR-BS/RS, other HR-MSs can tune in to listen and use that for channel measurement in the direct HR-MS link.

In a similar approach, when an HR-MS transmits a dedicated ranging signal, on known ranging channel, toward another HR-MS, the serving HR-BS/RS can tune in and use that for channel measurement in the uplink, i.e., from the transmitting HR-MS toward the HR-BS/RS.

802.16 networks may support a variety of physical and/or link interface layers, including, for example, orthogonal frequency-division multiple access (OFDMA) and advanced air interface (AAI). As such, there exists a need to provide effective addressing in, for example, 802.16 ODFMA and AAI networks.

In 802.16 OFDMA based networks, Connection Identifier (CID) is used for the addressing of control and data flow. For each MS, two or three control CIDs, Basic, primary and secondary CIDs, are assigned for control message scheduling and transmission when it joins the network. For each data flow, a unique CID is assigned.

An 802.16 OFDMA frame is divided into DL and UL sub frames. The scheduling information for DL and UL sub-frames are put into separate MAPs. Scheduling information is uniquely identified by CID.

Considering the characteristics of scheduling and addressing in 802.16 OFDMA based networks. CID is necessary for control message identification and the scheduling and transmission of control messages such as ARQ over a DC link.

There are two embodiments provided for the assignment of the CID to a direct communication link. The first one is to assign one CID to a DC link. It may be shared by two HR-MSs in both directions when transmit control messages such as ARQ. The second solution is to assign two CIDs and one for each direction.

In case only one CID is assigned to the direct communication link, a sharing mechanism has to be designed so that the two HR-MSs know which one should transmit when the CID appeared in the scheduling table, i.e. the DL/UL-MAP at beginning of a frame. To share the CID between two HR-MS, the schedule of transmission can be put into different sub frames. Each HR-MS can use one sub frame and it shall transmit based on scheduling information within the relative sub frame MAP and receive according to the scheduling information specified in the other sub frame. HR-BS can determine on which sub-frame an HR-MS should transmit the ARQ and notifies the HR-MS via control signaling.

Another embodiment is to use two CIDs, one CID for each direction. This allows the HR-BS to put all transmissions of control messages such as ARQ in one sub frame such as uplink. The HR-BS need to notify the HR-MS of the two CIDs assigned to the DC link and let each HR-MS knows CID for transmission and receiving. Since the HR-MSs are on the two ends of the DC-Link, the assignment of CID for transmission and receptions are reversed.

In 802.16 Advanced Air Interface (AAI) based networks with station Identifiers (STIDs), HR-MSs decode the scheduling and transmission based on STIDs. As discussed with regards to 802.16 OFDMA networks, one or two STIDs can be assigned to the DC link.

In case an STID is assigned to the DC link, the HR-BS has to separate the transmission over the direct communication link into two sub frames, DL and UL sub frames. Each HR-MS can only transmit one type of sub frames. The HR-BS determines the assignment and notifies the HR-MS on which sub frame it can transmits. The scheduling information is put into the relative MAP and specifies the resource is in UL or DL sub frame.

In case two STIDs are assigned to the DC link, each direction of a DC link is represented by a STID. The HR-BS should notify each HR-MS regarding the two STIDs. Further, the HR-BS should communicate which STID each HR-MS should use to transmit and which STID should be used for reception. Each HR-MS shall decode the MAP with the two STID assigned to it and schedule the transmission and reception accordingly.

Many wireless technologies are based on a centralized architecture, where one master/base station coordinates the network access of several associated subscriber stations (sub-stations). One example is when a base station controls channel access of its associated subscriber/mobile stations in a cellular network or a WiMAX network. Another example is when an Access Point (AP) coordinates channel access of several associated stations in a WiFi deployment (e.g., through Point Coordination Function). In such a centralized network, data/control messages cannot be exchanged between peer sub-stations. Rather, all these data/control messages need to be sent or received through the corresponding master/base station.

There is a recent trend of trying to support peer-to-peer direct communications between sub-stations in centralized networks. This means two stations can directly transmit to and receive from each other, i.e., without the data payload going through the master/base station. When doing so, certain control/signaling messages are still exchanged between the base station and sub-station to ensure channel access is carried out in a coordinated manner. One example is the currently being developed 802.16n standard for higher reliability WiMAX technology, where it is required that two mobile stations (MS) can communicate directly with each other over the air interface.

Another requirement is to support two-way multicast operation. This is the operation in which user within a multicast group can take turn to transmit data payload to the rest of the group members. Such operation is useful in public safety applications (Push to Talk), industrial machine-to-machine control, and even social networking.

Various embodiments address the above two requirements, i.e., to support two-way direct communications among a group of peer sub-stations in a centralized network. This technology disclosure proposes addressing schemes that can be use to efficiently support two-way direct multicast communication.

The addressing scheme for supporting two-way direct communications among a group of sub-stations comprises:

The base station assigns an address to each sub-station involving in the two-way direct communications.

The address assigned by the base station includes two fields, i.e., the group identifier and the transmitter identifier. The group identifier field is shared by all peer sub-stations in the two-way communications group while the transmitter identifier field can be the same or different for different sub-stations in the two-way communications group.

The base station allocates resource for data transmission to one or multiple of the group members by broadcasting an allocation message that conveys the address that has been previously assigned to the allocated sub-station(s).

For the sub-stations, upon receiving the broadcasted allocation message, each sub-station shall compare its assigned transmitter identifier and group identifier to the corresponding fields in the address conveyed by the broadcasted allocation message:

If both of the fields match, the sub-station knows that the transmission resource is allocated to it.

If only the group identifier field matches, the sub-station knows that the transmission resource is allocated to one of its fellow group members.

The allocated sub-station proceeds to transmit data to the rest of the group members and the other group members proceed to receive the transmitted data.

For the above addressing scheme, the base station can reserve one transmitter identifier field for itself to transmit data/control information to all sub-stations in the two-way communications group. When that is the case, in the above field-matching process, if a sub-station detects that its group identifier matches the corresponding field in the address conveyed by the broadcasted allocation message while the transmitter identifier field in the conveyed address is the value reserved for the base station, the sub-station proceeds to receive from the base station.

For the above addressing scheme, while the size of the address is fixed for all two-way direct communication groups, for different groups, the sizes of the Group Identifier and Transmitter Identifier can be different. This is valid as long as each sub-station knows the exact sizes of the Group/Transmitter Identifier fields for each particular two-way direct communication group it belongs to.

In the IEEE 802.16m-2011 specifications, allocation of transmission resources to mobile stations (MS) is based on CRC masking. An allocation message broadcasted by 802.16m base station does not contain the address of the allocated MS. Rather, the broadcasted allocation message is CRC masked based on the address of the allocated MS and therefore only the allocated MS with the right address can unmask and read the allocation details. In 802.16m, each broadcasted resource allocation message is masked by a 16-bit CRC mask, which is constructed as follows:

TABLE 849

Description of CRC Mask

| Masking Prefix (1 bit MSB) | Remaining 15 bit LSBs | |
|---|---|---|
| | Tape Indicator | Masking Code |
| 0b0 | 0b000 | 12 bit STID or TSTID |
| | 0b001 | Refer to Table 850 |
| | 0b010 | Refer to Table 851 |
| 0b1 | | 15 bit RA-ID: The RA-ID is derived from the AMS' random access attributes (i.e., superframe number (LSB 5 bits). frame_index (2 bits). preamble code index for ranging or BR (6 bits) and opportunity index for ranging or BR (2 bits)) as defined below: RA-ID = (LSB 5 bits of superframe number|frame_index| preamble_code_index|opportunity_index) |

It should also be noted that IEEE 802.16m specifications does not support direct communications between peer MSs and also does not support two-way multicast operation.

Various embodiments enhance addressing mechanism that allows 802.16n standard (based on 802.16m) to support two-way direct communications among a group of 16n HR-MS. This enhanced addressing mechanism follows the approach described above. Specifically, the addressing mechanism for supporting two-way direct communications among a group of 802.16n HR-MS comprises:

The base station assigns a 12-bit Two-Way Direct Multicast (TWDM) address to each HR-MS of a two-way direct communication group; each assigned TWDM address includes two non-overlapping fields, i.e., Two-way Group Identifier (TGID) and Two-way Transmitter Identifier (TTID). The sizes of TGID and TTID are fixed for each two-way direct communication group but can be different for different groups. All HR-MSs belonging to the same two-way direct communication group share the same TGID. The TTID of the HR-MSs belonging to the same group can be the same or different.

For each two-way direct communication group, the base station can reserve one value of TTID for itself. For example, this can be an all-0 TTID (all bits in the TTID are set to 0). The base station uses the reserved TTID to transmit data/control messages to the HR-MS belonging to the two-way direct communication group.

The base station informs all members of each two-way direct communication group of all the values of TTIDs that have been assigned to the member of the group; including the TTID reserved by the base station, if such a TTID is reserved. These assigned TTIDs form a so-called Possible Transmitter Set of the two-way direct communication group. This Possible Transmitter Set should be updated whenever HR-MS join or leave the two-way direct communication group.

For each broadcasted transmission resource allocation, i.e., 802.16m Assignment A-MAP Information Element, the base station employs the following CRC mask to indicate the specific allocated HR-MS within a particular two-way direct communications group:

The 1-bit Masking Prefix is set to 0.

The 3-bit Type Indicator is set to a value that is distinct from those that have already been used in the above table, i.e., different from 000, 001, 010. This means the Type Indicator can be set to a value in between 011-111. This chosen value shall be used in all CRC masking for all two-way direct communication groups. For example, the Type Indicator can be fixed at 011.

The remaining 12 bits are the TWDM address of the HR-MS that is allocated the transmission resource.

For each broadcasted resource allocation message, each HR-MS belonging to a particular two-way direct communication group can carry out the unmasking operation as follows:

For each TTID in the Possible Transmitter Set of the group, the HR-MS combines that TTID with the group TGID to get a 12-bit field that can be combined with the 1-bit Masking Prefix (equal to 0) and 3-bit Type Indicator (in the same order specified in the above table) to form a 16-bit CRC mask.

Based on the above 16-bit CRC mask, the HR-MS try to unmask the broadcasted resource allocation message.

The unmasking operation stops when the HR-MS has tried all TTIDs in the Possible Transmission Set without successfully unmasking or when it successfully unmask with a particular TTID, say TTID*. Based on the outcome:

If the unmasking operation end without success, the HR-MS concludes that the current transmission resource allocation is not for the particular two-way direct communication group, it should repeat the overall unmasking operation for other two-way direct communications groups it belongs to; note that an HR-MS can be a member of multiple two-way direct communications groups.

If the unmasking operation results in a successful unmask using TTID* then: i) If TTID* is the TTID assigned to the HR-MS, it shall proceed to transmit on the allocated resource; ii) If TTID* is the TTID reserved for the base station, the HR-MS shall prepare to receive from the base station; iii) If the TTID* does not belong to the HR-MS itself or to the base station, the HR-MS shall prepare to receive from one of its fellow group members.

As a special case of the above addressing mechanism, when only one TTID is always used in transmission resource allocation, the traditional one-way multicast operation may be used. To support such an operation, the length of the TTID can be limit to 1 bit.

As a special case of the above addressing mechanism, within a two-way direct communication group, multiple HR-MSs can be scheduled to transmit on the same transmission resource (in time and frequency). Those simultaneously scheduled HR-MSs share the same TTID.

In IEEE 802.16-2009 specifications, allocation of transmission resources to mobile stations (MS) is based on Connection Identifiers (CID). Each connection between the base station and a mobile station is assigned a 16-bit CID. In each broadcasted transmission resource allocation message, the CID of the particular connection (and corresponding to a particular MS) is explicitly specified.

Various embodiments introduce an enhanced addressing mechanism that allows 802.16n standard (based on 802.16-2009) to support two-way direct communications among a group of 16n MS (called HR-MS). This enhanced addressing mechanism follows the described approach. Specifically, our addressing mechanism for supporting two-way direct communications among a group of 802.16n HR-MS comprises:

The base station assigns a 16-bit CID to each HR-MS of a two-way direct communications group. The CIDs assigned to different HR-MSs belonging to the same group can be the same or different.

The base station can also specify one CID for itself to multicast to all HR-MSs belonging to a particular two-way direct communication group.

The base station informs all members of each two-way direct communication group of all the CIDs that have been assigned to the members of the group; including the CID reserved by the base station, if such a CID is reserved. These assigned CIDs form a so-called Possible Transmitter Set of the two-way direct communication group; The Possible Transmitter Set shall be updated whenever an HR-MS join or leave the two-way direct communication group.

For each broadcasted transmission resource allocation, i.e., DL-MAP Information Element, or UL-MAP Information Element, the base station specified the CID of the allocated HR-MS(s).

For each broadcasted resource allocation message, each HR-MS belonging to a particular two-way direct communication group shall check if the CID in the resource allocation matches any CID in the Possible Transmitter Set:

The CID checking stops when the HR-MS has tried all CIDs in the Possible Transmission Set without matching or when it find that there is a match for a particular CID, say CID*. Base on the outcome:

If the CID matching ends without success, the HR-MS concludes that the current transmission resource allocation is not for the particular two-way direct communication group, it should repeat the overall matching operation for other groups it belongs to.

If the CID matching operation results in a successful matching with CID* then: i) If CID* is the CID assigned to the HR-MS, it shall proceed to transmit on the allocated resource; ii) If CID* is the CID reserved for the base station, the HR-MS shall prepare to receive from the base station; iii) If the CID* does not belong to the HR-MS itself or to the base station, the HR-MS shall prepare to receive from one of its fellow group members.

For two HR-MSs to transmit to and receive from each other, synchronization much be achieved. Various embodiments describe processes of maintaining synchronization between two HR-MSs involving in direct communication, which are classified into two levels:

Frame-level synchronization allows HR-MSs to share a common understanding of frame timing and configuration.

Symbol-level synchronization allows transmissions between HR-MSs to be received within an appropriate reception threshold.

Synchronization mechanisms are specified for two different use cases as follows.

When both HR-MSs involving in direct communication or direct multicast are within the coverage of HR-BS/RS, the following synchronization mechanisms are used for HR-MS direct communications scheduled in the uplink area of a frame:

Frame-level Synchronization:

When both HR-MSs are able to receive preamble(s) and DL control signals from a common serving HR-BS/HR- RS, they can use these to achieve frame-level synchronization, with respect to the common HR-BS/HR-RS and between themselves.

Symbol-level Synchronization:

When the HR-MS/HR-MS direct link is scheduled in a UL area of a frame, the transmitting HR-MS follows the same timing advance as has been adjusted and agreed with the serving HR-BS/HR-RS. This means the transmitting HR-MS shall time its direct transmissions as if these are normal UL transmissions toward the serving HR-BS/HR-RS.

It is the responsibility of the receiving HR-MS to adjust its receive timing to match the time of arrival (TOA) of the signal transmitted by the other HR-MS. This time adjustment can be achieved by the serving HR-BS/HR-RS scheduling the HR-MSs to transmit ranging sequences to each other. Based on a received ranging sequence, an HR-MS can estimate and correct its time offset with the transmitting HR-MS.

When one HR-MS is inside of coverage and the other is outside of coverage of HR-BS/RS, the following synchronization mechanisms are used for HR-MS DC scheduled in the uplink area of a frame:

Frame-level Synchronization:

When two HR-MSs need to achieve frame-level synchronization and only one of them is within the coverage of the serving HR-BS/HR-RS, the inside-of-coverage HR-MS shall first acquires DL synchronization with the serving HR-BS/HR-RS (based on preamble(s) and control messages from the serving HR-BS/HR-RS). The inside-of-coverage HR-MS shall subsequently broadcast preamble(s) and network configuration information (NCI) for the outside-of-coverage HR-MS to co-synchronize.

Symbol-level Synchronization:

Using the preambles and NCI transmitted by the inside-of-coverage HR-MS, the outside-of-coverage HR-MS shall adjust its timing to receive messages transmitted from the inside-of-coverage HR-MS. To further improve synchronization in this direction, the inside-of-coverage HR-MS can transmit ranging signal toward the outside-of-coverage HR-MS so that this node can estimate and correct its time/frequency offsets. Symbol-level synchronization in the opposite direction, i.e., from the outside-of-coverage of HR-MS toward the inside-of-coverage HR-MS shall be achieved by the outside-of-coverage HR-MS transmitting ranging signal toward the inside-of-coverage HR-MS. Upon processing the received ranging signal, the inside-of-coverage HR-MS can either adjust its own receive timing or request the outside-of-coverage HR-MS to adjust the transmit timing.

Another important operation is hybrid ARQ, which can be supported over the MS-MS direct communication link through an embodiment described bellows.

HR-BS/RS initiates the process by transmitting a DC Assignment A-MAP IE, with the field "Direct Link A-MAP IE Type" set to "0b0000". The Direct Link Assignment A-MAP IE is CRC masked using the TWDC address of the transmitting HR-MS. Both transmitting and receiving HR-MS will be able to recognize this allocation and prepare to transmit/receive accordingly.

Upon receiving the DC Assignment A-MAP IE, the HR-MS scheduled for transmitting shall calculate the transmission timing based on the same specification in IEEE 802.16m-2011.

After receiving the DC Assignment A-MAP IE, the HR-MS scheduled for receiving shall attempt to receive subsequent transmission from the transmitting HR-MS. If the decoding is successful, the receiving HR-MS sends an ACK toward HR-BS/RS in the next frame, in the HARQ feedback channel specified by the field "HFA UL" in the DC Assignment A-MAP IE. Otherwise, if the decoding fails, the receiving HR-MS sends an NACK toward HR-BS/RS.

Based on the feedback from the receiving HR-MS, the HR-BSs shall carry out one of the following actions:

If the feedback from the receiving HR-MS is an ACK: HR-BS/RS sends an ACK in the DL HARQ feedback channel specified by the field "HFA DL" in the original DC Assignment A-MAP IE.

If the feedback from the receiving HR-MS is an NACK: HR-BS/RS sends an NACK in the DL HARQ feedback channel specified by the field "HFA DL" in the original DC Assignment A-MAP IE. The HR-BS may schedule a retransmission by sending another Direct Link Assignment A-MAP IE with the same ACID and AI-SN.

Together with sending ACK/NACK, the HR-BS may or may not transmit a new DC Assignment A-MAP IE.

Upon receiving ACK from the HR-BS/RS, if there is no new DC Assignment A-MAP IE from HR-BS/RS while the resource allocation in the original DC Assignment A-MAP IE still applies to the next frame, the transmitting and receiving HR-MSs proceed with a new HARQ attempt. Whether or not the resource allocation still applies to the next frame is determined by the field "Number of valid frames" in the original DC Assignment A-MAP IE.

Upon receiving NACK from HR-BS, if there is no new DC Assignment A-MAP IE from the HR-BS and the resource allocation in the original DC Assignment A-MAP IE still applies to the next frames, the transmitting HR-MS proceeds to re-transmit the HARQ subpacket in the allocated resource.

If there is a new DC Assignment A-MAP IE from the HR-BS, the new assignment IE shall supersede the original DC Assignment A-MAP IE and the transmitting and receiving HR-MSs shall follow the new allocation accordingly.

Table 1 describes the fields in a Direct Communication (DC) Assignment A-MAP IE used for resource assignment to the direct link between two HR-MSs involving in BS-controlled HR-MS direct communications.

DC Assignment A-MAP IE is CRC masked with the Type Indicator set to 0b011. This value of Type Indicator distinguishes DC Assignment A-MAP IE from DL/UL assignments.

TABLE 1

Direct Communication (DC) Assignment A-MAP IE format

| Syntax | Size (bits) | Notes |
|---|---|---|
| Direct Communication Assignment A-MAP_IE{ | | |
| Direct Link A-MAP IE Type | 4 | Set to 0b0000 |
| $I_{SizeOffset}$ | 5 | Offset use to compute burst size index |

TABLE 1-continued

Direct Communication (DC) Assignment A-MAP IE format

| Syntax | Size (bits) | Notes |
| --- | --- | --- |
| MEF | 1 | MIMO encoder format<br>0b0: SFBC<br>0b1: Vertical Encoding with only 1 stream |
| Resource Index | 11 | 512 FFT size: 0 in first 2 MSB bits + 9 bits for resource index<br>1024 FFT size: 11 bits for resource index<br>2048 FFT size: 11 bits for resource index<br>Resource index includes location and allocation size |
| HFA DL | 3 | HARQ Feedback Allocation in the DL |
| HFA UL | 3 | HARQ Feedback Allocation in the UL |
| ACID | 4 | HARQ channel identifier |
| AI_SN | 1 | HARQ identifier sequence number |
| Number of valid frames | 5 | Number of frames that this allocation applies to; when equal 0b0000, indicate the de-allocation of the defined resource. |
| Reserved } | 3 | To make the size equal 40 bits |

Thus a mobile station for performing direct mobile-to-mobile communication in a cellular mobile communication system, the cellular mobile communication system comprising at least two mobile stations and a communication network for providing a communication connection between the at least two mobile stations via at least one base station of the communication network is may be provided. The mobile station includes a transceiver configured to perform communication with other mobile stations, a detector configured to perform neighbor discovery, report the results of the neighbor discovery to other stations, record the results from the neighbor discovery including any transmitted address information, and using the recorded results, determine the feasibility of direct communication for a given mobile station, and a synchronizer configured to synchronize a link between the mobile station and another mobile station. The synchronizer may be configured to transmit and receive ranging codes. The synchronizer may be configured to transmit and receive synchronizing preambles.

Figure 9:
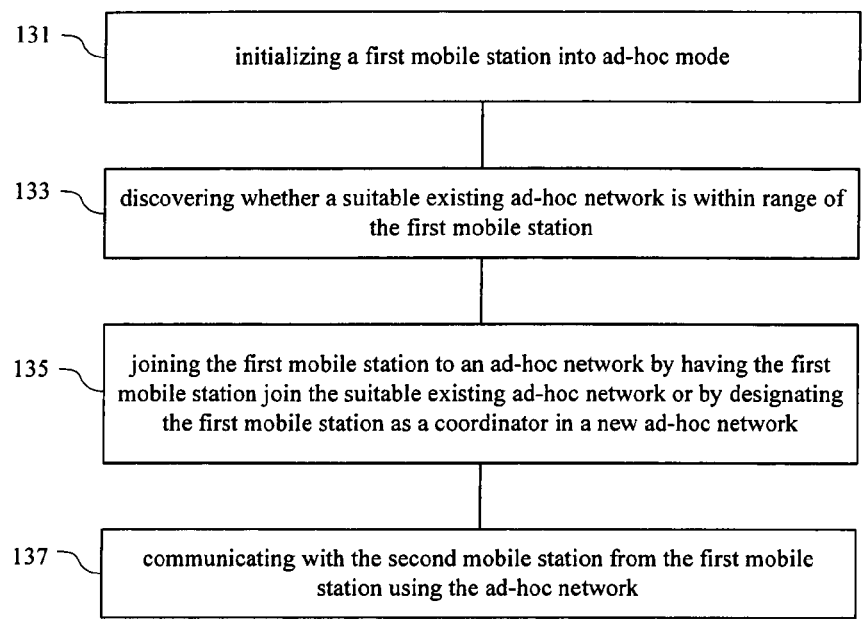
FIG. 9 shows a flow diagram according to an embodiment.

FIG. 9 shows a flow diagram according to an embodiment. In particular, a method for performing communication in a mobile ad-hoc network includes initializing 131 a first mobile station into ad-hoc mode, discovering 133 whether a suitable existing ad-hoc network is within range of the first mobile station, joining 135 the first mobile station to an ad-hoc network by having the first mobile station join the suitable existing ad-hoc network or by designating the first mobile station as a coordinator in a new ad-hoc network, and communicating 137 with the second mobile station from the first mobile station using the ad-hoc network. The coordinator may generally be a device with similar functionality as a base station. Thus an HR-MS may be capable of performing direct communication with another HR-MS without a supporting HR-BS as described in further detail below.

Figure 10:
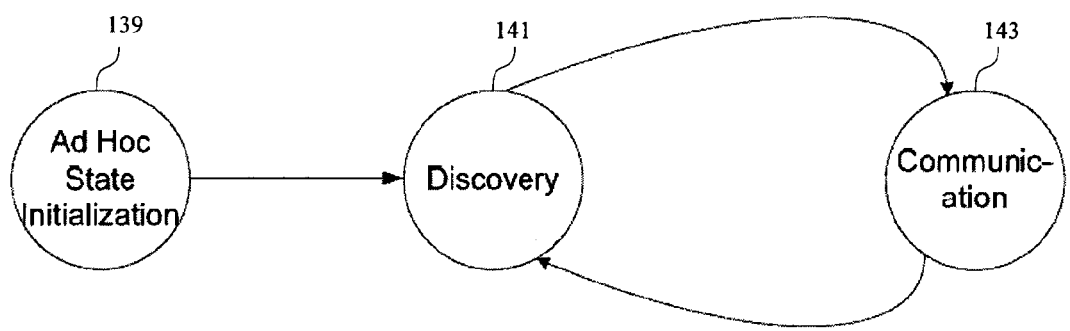
FIG. 10 shows a state transition diagram according to an embodiment.

FIG. 10 shows a state transition diagram according to an embodiment. With existing 802.16 networks, for a MS to communicate with other MSs it must first find a base station and then associate to the network. After network association, the MS can communicate to other nodes on the network. However, for HR-MSs in 802.16n networks, HR-MSs are allowed to communicate to each other without associating to any BS. Considering the difference of communication behavior, communication by HR-MSs in 802.16n may be categorized into two modes, namely an infrastructure mode and an ad-hoc mode. HR-MSs can only be in one or the two modes at one time.

For MS to MS direct communication without a supporting base station, HR-MSs discover HR-MSs in their vicinity and then communication with one another once they have setup a network among themselves in certain area. Therefore, an HR-MS can be in at least two states, a discovery state 141 and a communication state 143. In addition, HR-MSs can also nominally be in an ad-hoc initialization as a starting state into ad-hoc mode. In discovery state 141, an HR-MS attempts to find neighbor nodes by either listening to the channel or transmitting messages to facilitate discovery of itself by other HR-MSs. After an HR-MS finds other HR-MSs and forms a network, it can communicate with the nodes in the network in communication state 143.

In existing 802.16 networks, network discovery is the process of MS or RS discovering BS or RS. A BS or RS usually transmits preambles and necessary system information periodically to the air so that MS can detect their existence and make decisions for network entry or handover.

The network discoveries for 802.16n networks in ad-hoc mode are different from legacy systems such as 802.16e and 802.16m. There may be no network and HR-MSs cannot join the network by simply listening to the channel. HR-MSs may have to organize a network by themselves by exposing some necessary information. Therefore, after an HR-MS is turned on, it may listen to the channel first to check whether there is a network formed by HR-MSs. If there are already networks formed by HR-MSs, the HR-MS may join the existing network for communication. In case the HR-MS cannot find a HR-MS network or an existing network is not suitable for it to join, the HR-MS may choose to start a network by itself. It is possible that two nodes may transmit the network discovery message at the same time and collision may happen. Random back-off time intervals between network discovery messages may be necessary to avoid consistent collision.

Figure 11:
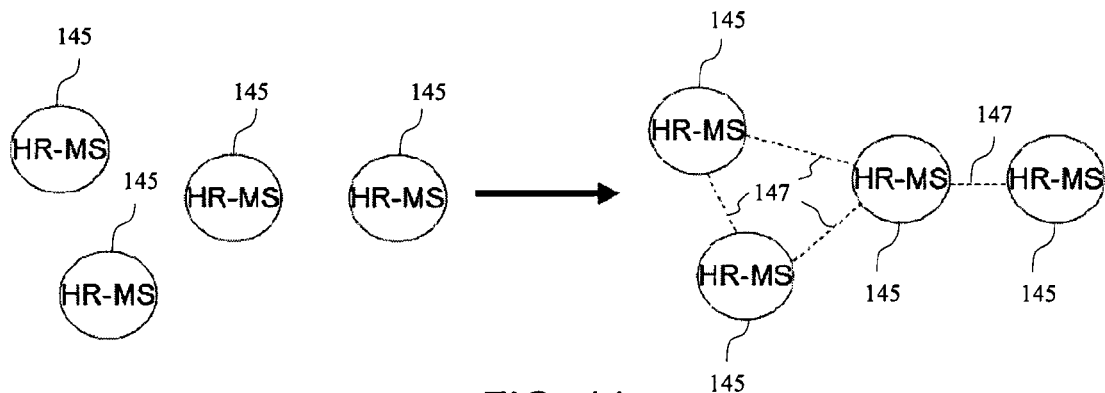
FIG. 11 shows a communication system according to an embodiment.

FIG. 11 shows a communication system according to an embodiment In an 802.16n network, to make system robust to the infrastructure damage, HR-MSs 145 are designed to be able to communicate to each other even if when the infrastructure stations are down. A few HR-MSs 145 close to one another are allowed to form a small HR-MSs network and communicate 147 with one another. Since the 802.16 standard is designed as a cellular system, in order to avoid significant changes of protocols, a centralized network controller is necessary. The central controller can be a BS or a newly defined station type. However, the HR-MSs network may be more dynamic than the current 802.16 network since the BS is fixed and pre-planed in the current 802.16 networks while in 802.16n, the simply turning an HR-MS to a BS may not work well due to the mobility and dynamics of the network. HR-MS may also have limited computing capability and battery power, factors which are usually not significantly considered in current BS designs.

In an HR-MSs network, one of the HR-MSs becomes a network controller and coordinates the communication among the HR-MS in the vicinity. The HR-MS based network controller is termed a coordinator. The coordinator is generally a simplified BS without some unnecessary functionality, such as hand over functionality. Additional functionality may also be included.

Figure 12:
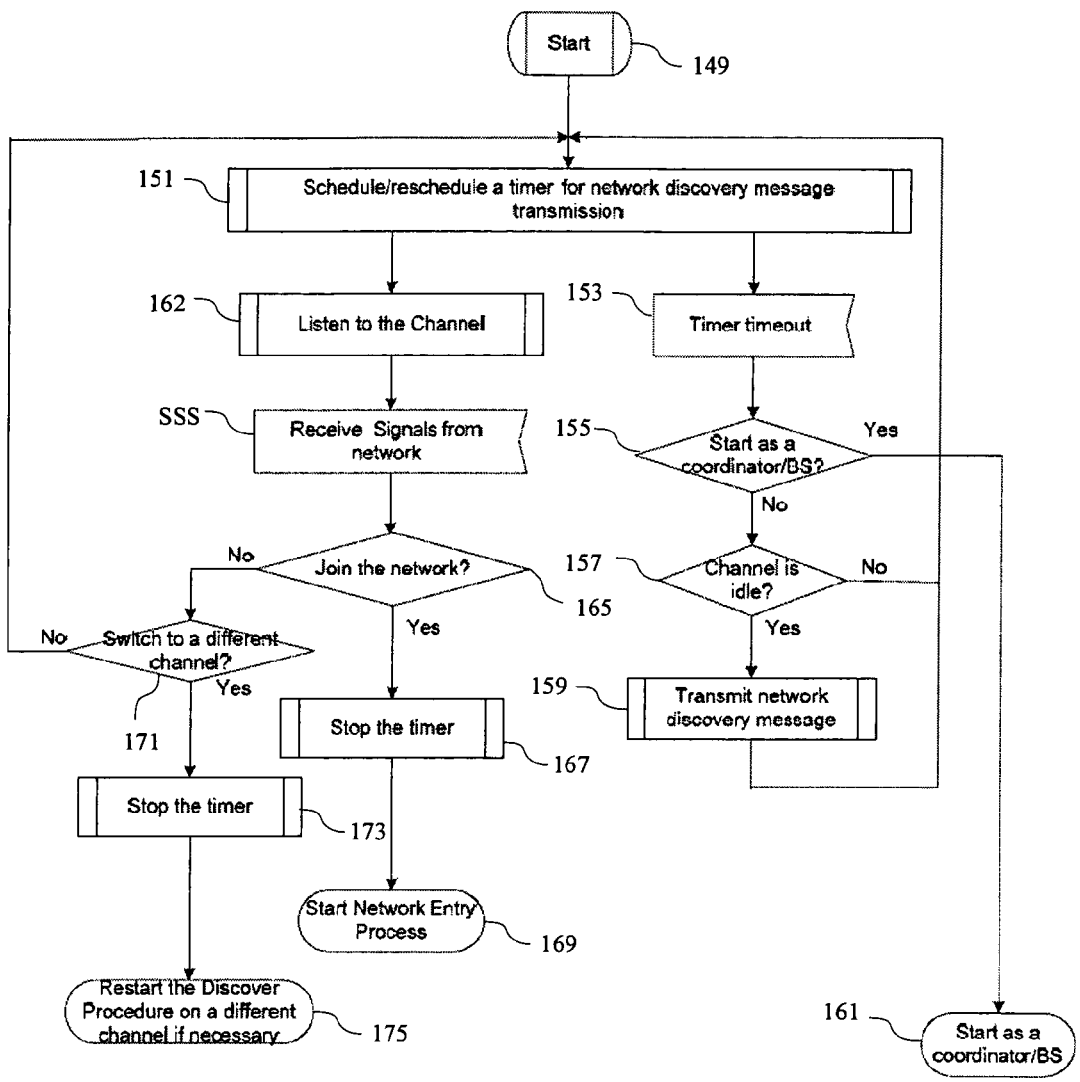
FIG. 12 shows a flow diagram according to an embodiment.

FIG. 12 shows a flow diagram according to an embodiment. When an HR-MS cannot associate to a base station and is allowed to communicate to other HR-MS directly, it may search to find existing HR-MS networks or other HR-MSs nearby and transmit discovery messages to let other HR-MSs know its existence. Since multiple HR-MS may transmit discovery message at the same time due to a lack of coordination, there is a method considering collision of discovery messages.

The HR-MS schedules 151 a timer for network discover. The timeout value can be a predetermined value or some value based on a predefined algorithm, for example, from a window having wmin and a wmax. This random value helps in avoiding collision among HR-MSs in transmitting during network discovery. The window size may vary based on the possible traffic on the channel. After the timer is scheduled, the HR-MS scans the channel listening 162 for synchronization signals from other network stations. When the HR-MS receives 163 a synchronization signal from another network station, the HR-MS determines 165 whether to join the network. If the HR-MS determines to join the network, then the HR-MS should stop 167 the timer and start 169 the network join process. If the HR-MS does not join the network, then the HR-MS may determine whether to switch 171 to a different channel. If the HR-MS decides to switch to different channel, then it stops the timer and starts the discovery process again using a different channel. If the HR-MS stay on the same channel, for example, because a discovery message has been received from another HR-MS, then it may adjust the timer if it is necessary and restart the process. If no suitable networks have been found when the timer expires 153, the HR-MS may decide whether to become a coordinator 155. If the HR-MS decides to become a coordinator, then it stops the discovery process and becomes a coordinator. Otherwise the HR-MS should sense whether the channel is idle 157 and accordingly transmit 159 a network discovery message. After the network discovery message has been transmitted, or if the channel is busy, the discovery process should be restarted.

A coordinator can be either chosen by user or by the HR-MSs based on discovered network topology information. An HR-MS can also become a coordinator after sending out certain number of discovery messages.

Thus in an embodiment, discovering whether a suitable existing ad-hoc network is within range of the first mobile station includes listening on an air interface with the first mobile station for a predetermined period, determining whether activity on the air interface is from an existing ad-hoc network, and whether the existing ad-hoc network is suitable. The embodiment may further include setting a network discovery timer for the first mobile station that upon expiry indicates that no suitable existing ad-hoc network is within range of the first mobile station. Moreover, the embodiment may include selecting a random-back-off period for the first mobile station before reattempting to discover whether a suitable existing ad-hoc network is within range, and/or sensing and transmitting network discovery messages periodically. Various embodiments in designating the first mobile station as a coordinator in a new ad-hoc network may include comparing the media access control (MAC) address of the first mobile station to the MAC addresses of other mobile stations within range of the first mobile station, and/or comparing the number of other mobile stations within range of the first mobile station with the number of mobile stations within range of each of said other mobile stations.

Figure 13:
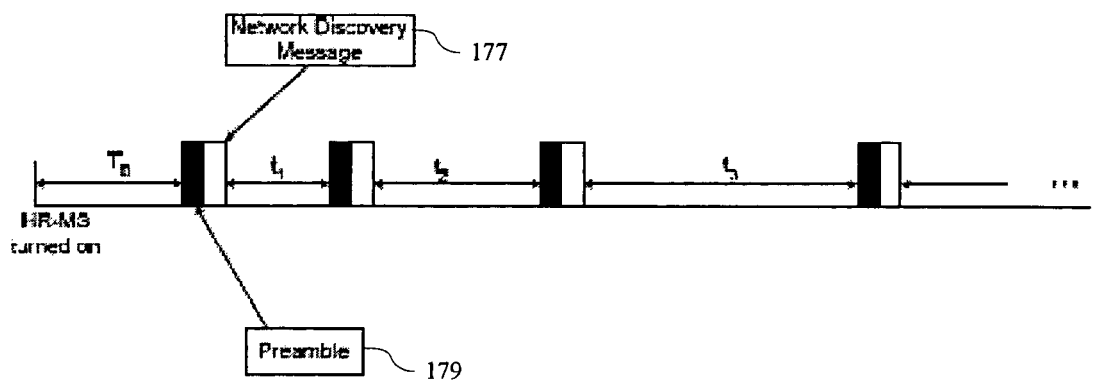
FIGS. 13-16 show data timing diagrams according to embodiments.

FIGS. 13-16 show data timing diagrams according to embodiments. With reference to FIG. 13, when the HR-MS is initialized into ad-hoc mode, it first listens to the air for certain period, $T_0$ ($T_0 > w_{max}$), to check whether there are networks exist. If it finds a network, it may join the network. Otherwise, the HR-MS may choose to become a coordinator and start a network by itself. If it does not join a network or does not start a network, the HR-MS may first set a network discovery timer and also choose a random back-off time from [$w_{min}$, $w_{max}$] window. The HR-MS then listen to the channel for network discovery messages 177 from other HR-MSs. If it finds a network, then it may join the network, otherwise it may change the network discovery timer and continue scanning until the back-off timer expires.

Upon expiration of the back off timer, the HR-MS may transmit a network discovery message 177. In case the channel is busy, the HR-MS may postpone the transmission by skipping the current neighbor discovery message transmission. If the network discovery timer does not timeout, the HR-MS continues network discovery. If network discovery times out, the HR-MS become a coordinator and start a network by itself. A node can stay in discovery mode until it needs to transmit data to other nodes or it is invited by another node for communication. The information included in the network discovery message may be, for example, a MAC address, a node name, an IP address, a number of neighbors, the information of each neighbor including, for example, their name, MAC address, and IP address.

In 802.16 networks, in order to enable the MS discover to the BS/RS, the BS/RS usually transmits a preamble 179 on the downlink followed by necessary system configuration information. For example, in 802.16e network, each frame is started with a preamble 179 and is followed by a Frame Control Header (FCH), and a Downlink/Uplink MAP, for example. Therefore, for HR-MS based on 802.16e technology, the HR-MS should transmit discovery messages by sending out an 802.16e preamble 179 followed by a FCH and necessary network discovery information required by 802.16n. It can transmit the discovery message as illustrated. It can also transmit a few discovery messages periodically before choosing a random back-off time interval.

For 802.16m network, two types of preamble, primary advanced (PA) preamble and secondary advanced (SA) preamble are transmitted. In each super frame, the PA-preamble is transmitted at the beginning of the second frame in each superframe (each superframe consists of for frames and the duration of each frame is five millisecond) and the SA-preamble is transmitted at the beginning of the first and the third frame. System configuration follows the first SA-preamble.

Figure 14:
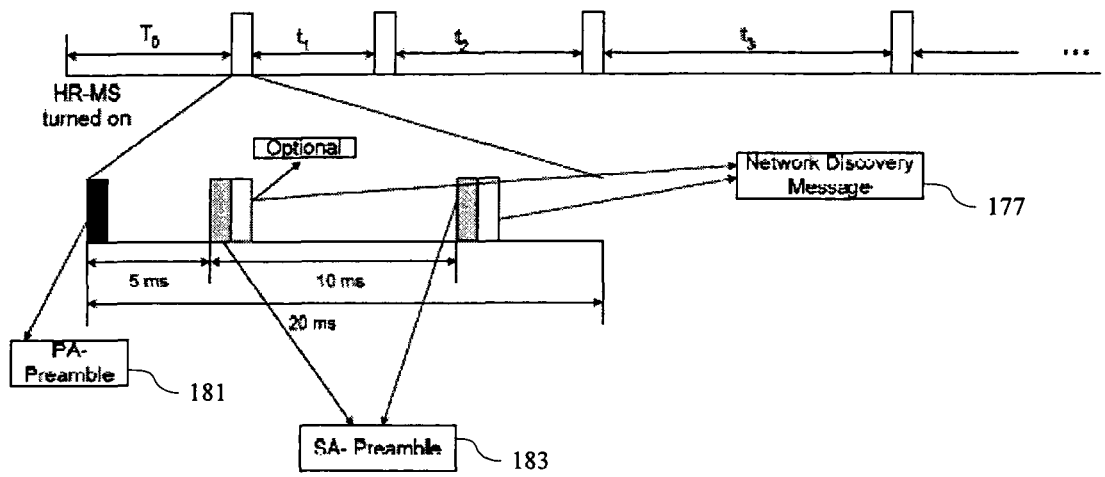

With reference to FIG. 14, a different transmission form is illustrated which requires small changes to the 802.16m preamble transmission and synchronization procedure. The changes are the transmission does not start from SA-preamble as in a normal superframe. It starts with a PA-preamble 181 and sends SA-preambles 183 at 5 ms and 15 ms respectively. Network discovery messages 177 at the first SA-preamble may be optional.

Figure 15:
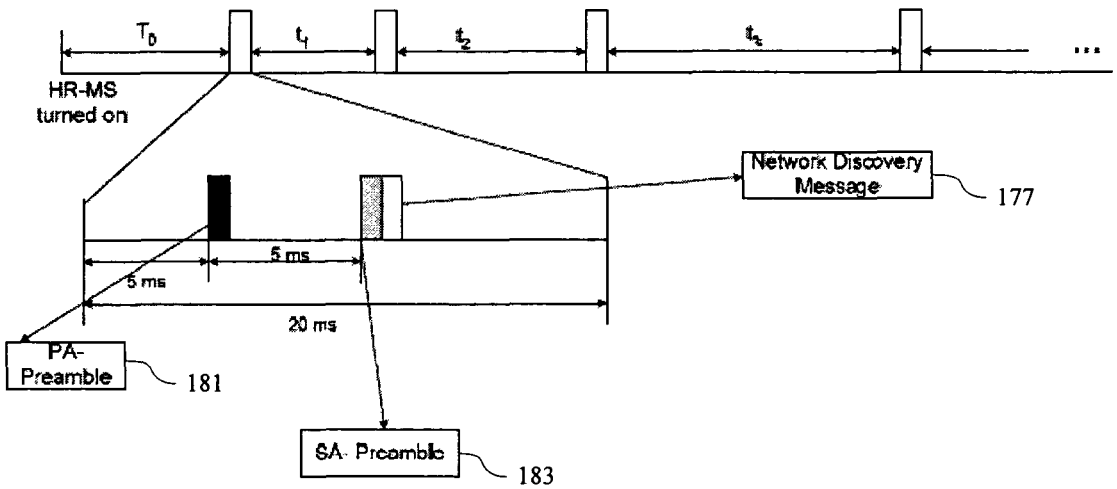

With reference to FIG. 15, another transmission form is illustrated. PA-Preamble 181 is transmitted at the beginning of the second frame. An SA-Preamble 183 is transmitted at the beginning of third frame and network discovery information 177 follows the SA preamble. Such a transmission form makes more changes to the existing transmission form, but also sends fewer preambles.

Figure 16:
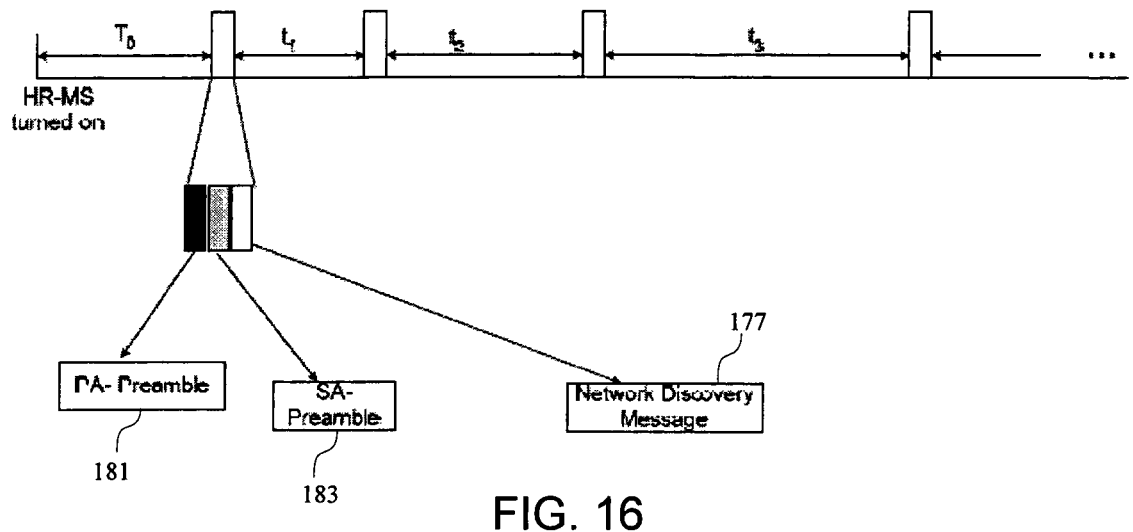

With reference to FIG. 16, yet another transmission form is illustrated which transmits PA 181 and SA-preambles 183 back to back. That is, a SA-Preamble 183 immediately follows a PA-preamble 181. Other network configuration information 177 follows the SA-Preamble 183. With this method, the node no longer is required to follow the superframe structure defined in the 802.16m which may simplify the network discovery process.

Figure 17:
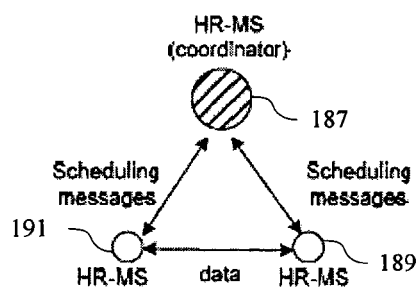
FIGS. 17-18 show flow diagrams according to embodiments.
Figure 18:
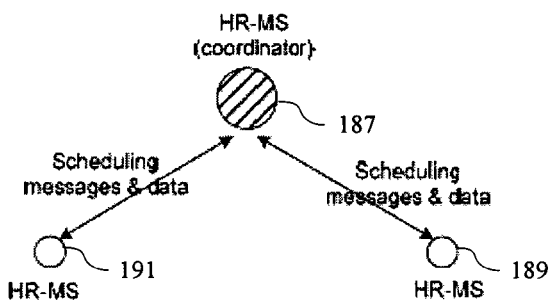

FIGS. 17-18 show flow diagrams according to embodiments. Although the point-to-multi-point (PMP) network organization mechanisms of 802.16 networks are capable of functioning in ad-hoc mode, the HR-MSs are better suited in forming a structural network in order to communicate with each other. One possible method of forming a structural network involves selecting one of the nodes 187, 189, 191 as a coordinator 187 to assist other nodes in scheduling and forwarding. More particularly, the coordinator's functions include: coordinating communication, broadcasting node information, and forwarding data.

A node is allowed to nominate itself as a coordinator when either it cannot find other nodes in the network or determines that it is the best role for coordinator. Various methods can be used for coordinator selection. Numbers, for example, may be attached to discovery message in order to facilitate coordinator selection. Another method includes a node comparing the MAC address of its single hop neighbors to decide whether it or its neighbor should become a coordinator based on whose MAC address is the largest one. Another method involves a node with more neighbors becoming the coordinator. Such a method can be realized by increasing the network discovery timer if a node finds a neighbor with a larger number of neighbors that itself before the timer value reach the maximum value. Another solution includes a node sending node discovery messages for a certain period of time and then determining whether it should become a coordinator. Once the node makes the decision to become a coordinator, it may declare that it will become a coordinator and announce a time at which it will start its role (transmitting frame preambles regularly).

The coordinator should transmit preambles and network configuration regularly. It may not transmit the preamble for every superframe. For example, if there is no traffic in the network, the coordinator may transmit frame preambles every K superframes. K*20 ms should less than, where $t_{max}$ is the maximum value for the random back-off in the network discovery for HR-MS.

The coordinator should schedule the ranging slot for HR-MS to join and measure the distance. The HR-MS should help other associated HR-MSs in resource allocation. The allocation should have certain persistency so that the HR-MS are not required to transmit MAPs in downlink. The coordinator should also schedule HR-MSs for neighbor network scanning. The interval between scanning can be a random value also. The coordinator may broadcast the name, IP address of the nodes associate to it.

Figure 19:
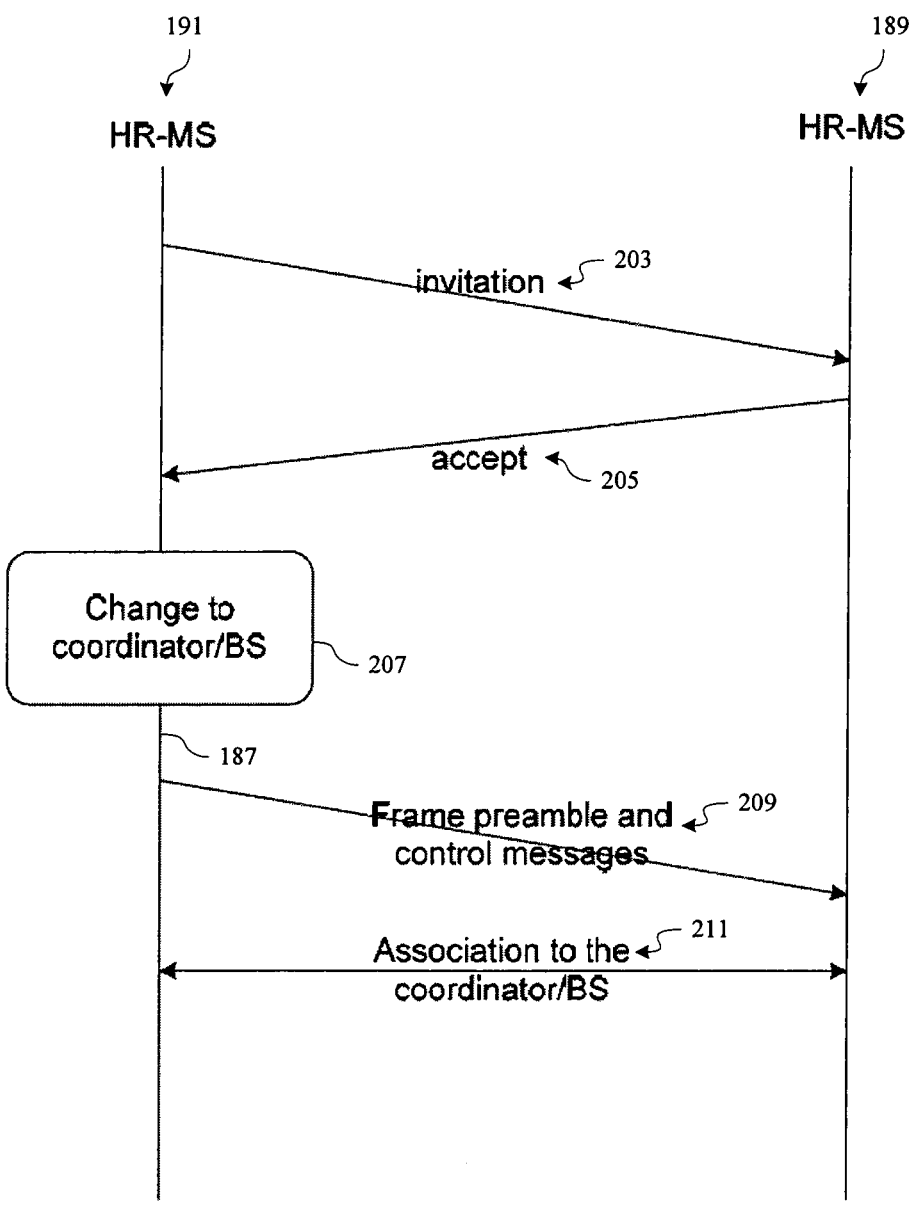
FIG. 19 shows a message flow diagram according to an embodiment.

FIG. 19 shows a message flow diagram according to an embodiment. Since the setup and maintenance of HR-MS networks may consume more energy than a traditional HR-BS network, in order to conserve energy, when a node only wants to disclose a limited amount data or information to a HR-MSs in the node's vicinity, the node may be allowed to attach a short data packet in discovery messages. HR-MSs hearing the discovery message can decode the data packet. Receiving node may also decode the packet and pass to other nodes nearby.

To communicate to other HR-MS nearby, a node can also invite some specific nodes for communication by attaching an invitation 203 request in the discovery messages. The HR-MSs that are aware of the invitation 203 may indicate that they accept/reject 205 the invitation 203. With the reply from other HR-MSs, the HR-MS that sends out the invitation request may change 207 its role to a coordinator and commence its duties 209, 211.

Figure 20:
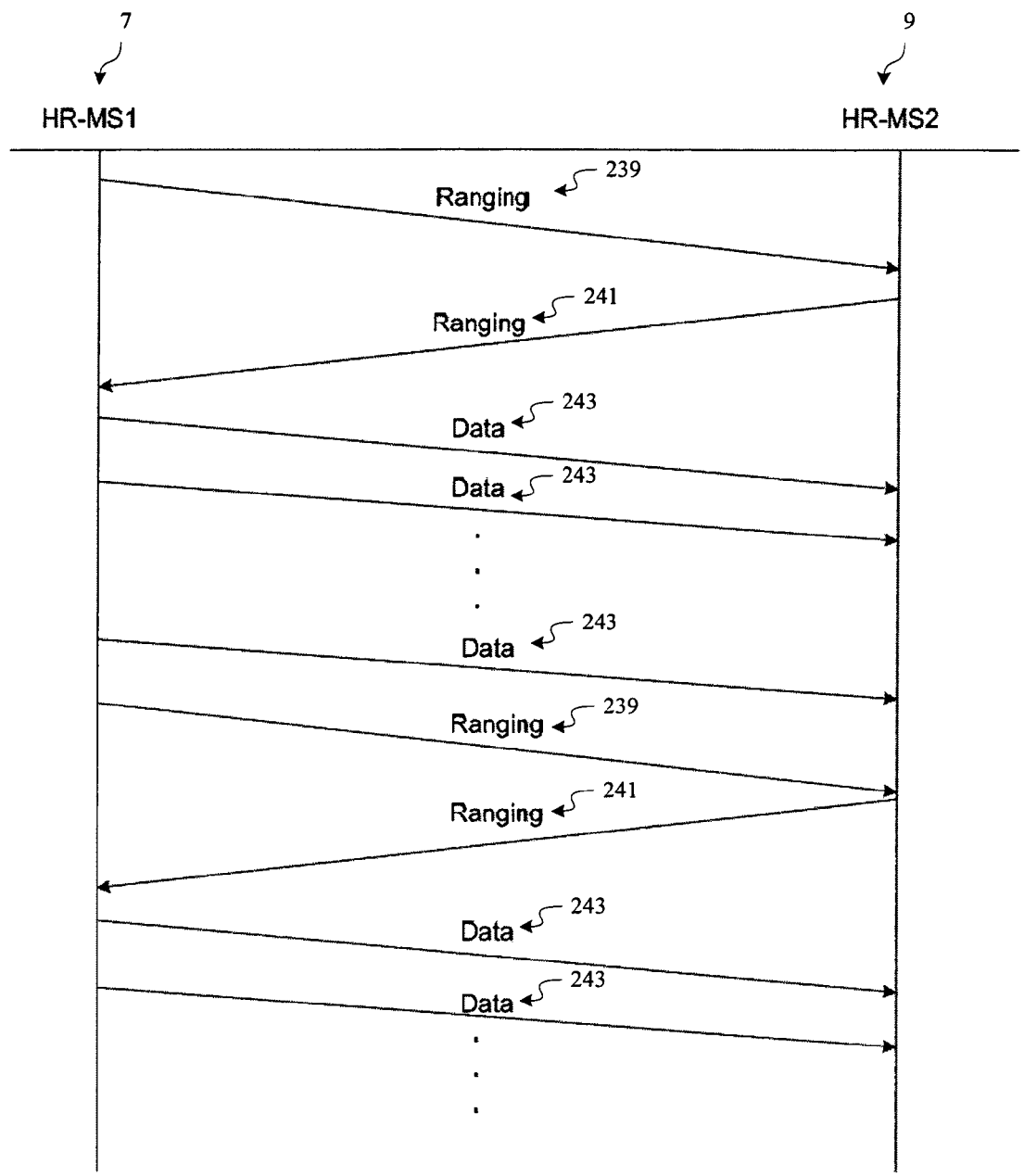
FIG. 20 shows a message flow diagram according to an embodiment.

FIG. 20 shows a message flow diagram according to an embodiment. Synchronizing the link between the first mobile station and the second mobile station may include transmitting, from the first mobile station to the second mobile station, a first ranging code, and transmitting, from the second mobile station to the first mobile station, an acknowledgment in the form of a second ranging code.

After getting the flow-ID and transmission opportunity, the first action for the HR-MS is synchronization for the direct transmission link. One way is using the preamble. However, using the preamble may require a new preamble design.

Another means for synchronization for the direct transmission link is to use a ranging code in the synchronization. The source HR-MS can transmit a ranging code 239 on the assigned sub-channels. After transmitting the ranging code, the source HR-MS may wait for an ACK, which is also a ranging code 241, back from the destination HR-MS. After the synchronization process on the sub-channel for direct communication, the node can transmit data 243 on the sub-channel then. The ranging between the source and destination HR-MS may be performed periodically.

Synchronization between a HR-MS and a coordinator may follow the traditional style, using the preambles on downlink and periodical ranging signals on the uplink. Additionally, when two HR-MSs are close to one another and want to communicate, they can transmit data directly instead of asking the coordinator to forward data, similar to MS-BS-MS communication style in legacy networks.

To communicate to each other directly, the HR-MS need to synchronize to each other before they transmit the data. A possible way is using the ranging code. The HR-MSs can use the subchannels and time slot assigned for data communication for ranging. It can use the same method proposed in section 3.3 to establish a direct communication between two HR-MS that is nearby each other.

For data transmission between HR-MS and its coordinator, normal connection setup procedure as in 802.16e and 802.16m network may be followed. That is, the DSA_REQ, DSA_RSP and DSA_ACK are used for service connection setup.

In 802.16 networks, data transmissions in the downlink and uplink need to be acknowledged. For HR-MS direct communication, without passing data to coordinator, such an acknowledgement can be transmitted on the radio resource allocated for the direct communication. The source and destination HR-MS can negotiate or indicate the acknowledgement transmission.

An example scenario of how HR-MSs may perform HR-MS direct communication without infrastructure stations is given as follows:

Two HR-MSs enters ad hoc mode and finish initialization.

The two HR-MSs scan the channel and do the neighbor discovery. They may maintain a list of neighbors it has been found.

If the source HR-MS want to communicate with one of its neighbor and both of them are still in discovery mode, the HR-MS may turn itself to a coordinator and transmits preambles as if it is a base station. It may invite the destination HR-MS for communication.

The destination HR-MS can either join the network started by source HR-MS proactively or accept the invitation from source HR-MS after get permission from user.

They can start to communicate once the destination HR-MS joining the network.

After the communication finishes, the tow HR-MS may change back to discovery state again.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. A method for performing direct mobile-to-mobile communication in a cellular mobile communication system, the cellular mobile communication system comprising at least two mobile stations and a communication network for providing a communication connection between the at least two mobile stations via at least one base station of the communication network, the method comprising:
    associating a first mobile station and a second mobile station with the at least one base station;
    performing neighbor discovery between the first mobile station and the second mobile station for reporting to the at least one base station;
    detecting the feasibility of direct communication between the first mobile station and the second mobile station;
    establishing a direct communication link between the at least two mobile stations;
    allocating identification for communication and flow, and resources for a flow, between the first mobile station and the second mobile station;
    synchronizing the flow between the first mobile station and the second mobile station; and
    sending automatic repeat requests (ARQ) messages;
    wherein synchronizing the flow between the first mobile station and the second mobile station comprises:
    transmitting, from the first mobile station to the second mobile station, a first ranging code;
    adjusting a timing on the second mobile station based on the first ranging code; and
    transmitting, from the second mobile station to the first mobile station, an acknowledgement in the form of a second ranging code.

2. The method according to claim 1,
    wherein performing neighbor discovery between the first mobile station and the second mobile station for reporting to the at least one base station comprises transmitting a predefined signal from the first mobile station and detecting the predefined signal from the second mobile station, and
    wherein detecting the feasibility of direct communication between the first mobile station and the second mobile station comprises determining whether the base station has stored address information corresponding to the mobile stations, and whether the first mobile station has a link condition to the second mobile station above a predetermined threshold, the link condition being a received signal strength (RSS) or a signal to noise ratio (SINR), or a frequency offset, or a time offset, or a propagation delay, or a combination of these factors.

3. The method according to claim 1, wherein detecting the feasibility of direct communication between the first mobile station and the second mobile station comprises:
    maintaining a neighboring table on the at least one base station that lists address information for mobile stations that are capable of direct communication; and
    determining whether the neighboring table on the at least one base station lists address information indicating that the first mobile station and the second mobile station are capable of direct communication between one another, and whether the first mobile station has a link condition to the second mobile station above a predetermined threshold, the link condition being a received signal strength (RSS) or a signal to noise ratio (SINR), or a frequency offset, or a time offset, or a propagation delay, or a combination of these factors.

4. The method according to claim 1, wherein identification for communication and flow comprises a station id (STID) or a connection (CID), and the STID or CID is assigned to the direct communication link.

5. The method according to claim 1, wherein allocating resources for a flow between the first mobile station and the second mobile station comprises:
    a dynamic service add request (DSA-REQ) from the first mobile station to the at least one base station, the dynamic service add request including address information corresponding to the first mobile station and address information corresponding to the second mobile station;
    reserving communication and flow identification, and resources;
    sending, from the base station to the first mobile station, notification that a direct communication service flow is going to be setup between the first and the second mobile stations;
    communicating the reserved communication and flow identification, and resources, to the second mobile station;
    sending, from the at least one base station to the second mobile station, notification of the dynamic service add request (DSA-REQ);
    sending, from the second mobile station to the at least one base station, a dynamic service add response (DSA-RSP);
    sending, from the at least one base station to the second mobile station, a dynamic service add acknowledgement (DSA-ACK);
    communicating the reserved communication and flow identification, and resources, to the first mobile station;
    sending, from the at least one base station to the first mobile station, notification of the dynamic service add response (DSA-RSP);
    sending, from the at least one base station to the first mobile station, a dynamic service add acknowledgement (DSA-ACK); and
    monitoring the reserved radio resources by the second mobile station for a synchronization signal.

6. The method according to claim 1, wherein allocating radio resources for a flow between the first mobile station and the second mobile station comprises:
    reserving communication and flow identification, and resources;
    communicating the reserved radio resources to the second mobile station;
    sending a dynamic service add request (DSA-REQ) from the at least one base station to the second mobile station;
    sending, from the second mobile station to the at least one base station, a dynamic service add response (DSA-RSP);
    sending, from the at least one base station to the second mobile station, a dynamic service add acknowledgement (DSA-ACK);
    communicating the reserved radio resources to the first mobile station;
    sending a dynamic service change request (DSC-REQ) from the at least one base station to the first mobile station;
    sending, from the first mobile station to the at least one base station, a dynamic service change response (DSC-RSP);
    sending, from the at least one base station to the first mobile station, a dynamic service change acknowledgement (DSC-ACK); and
    monitoring the reserved radio resources by the second mobile station for a synchronization signal.

7. The method according to claim 1, further comprising providing frame synchronization.

8. The method of claim 7, wherein frame synchronization comprises transmitting preambles at the beginning of each frame from the base station or from either the first mobile station or the second mobile station.

9. A mobile station for performing direct mobile-to-mobile communication in a cellular mobile communication system, the cellular mobile communication system comprising at least two mobile stations and a communication network for providing a communication connection between the at least two mobile stations via at least one base station of the communication network, the mobile station comprising:
- transceiver configured to perform communication with other mobile stations;
- a detector configured to perform neighbor discovery, report the results of the neighbor discovery to other stations, record the results from the neighbor discovery including any transmitted address information, and using the recorded results, determine the feasibility of direct communication for a given mobile station; and
- a synchronizer configured to synchronize a link flow between the mobile station and another mobile station, wherein the synchronizer is configured to transmit to said another mobile station, a first ranging code for adjusting a timing on said another mobile station based on the first ranging code, and receive, from said another mobile station, an acknowledgement in the form of a second ranging code.

10. The mobile station of claim 9, wherein the synchronizer is configured to transmit and receive synchronizing preambles.

* * * * *